United States Patent [19]

Sieja et al.

[11] Patent Number: 5,086,245
[45] Date of Patent: Feb. 4, 1992

[54] BRUSHLESS DC MOTOR SLOTTED TOOTH LAMINATION

[75] Inventors: Alan E. Sieja, Montevideo; Erland Persson, Minneapolis, both of Minn.

[73] Assignee: S1 Montevideo Technology, Inc., Montvideo, Minn.

[21] Appl. No.: 487,903

[22] Filed: Mar. 6, 1990

[51] Int. Cl.$^5$ .................. H02K 1/12; H02K 23/42
[52] U.S. Cl. ................................ 310/216; 310/51; 310/187
[58] Field of Search ............ 310/51, 179, 180, 187, 310/185, 216, 254, 156

[56] References Cited

U.S. PATENT DOCUMENTS

| | | | |
|---|---|---|---|
| 2,698,910 | 1/1955 | Blyth | 310/51 |
| 2,827,582 | 3/1958 | Krebs | 310/168 |
| 4,672,253 | 6/1987 | Tajima et al. | 310/269 |
| 4,761,576 | 8/1988 | Savage | 310/51 |
| 4,794,292 | 12/1988 | Torisawa | 310/257 |
| 4,874,975 | 10/1989 | Hertrich | 310/186 |
| 4,890,024 | 12/1989 | Hashimoto et al. | 310/185 |
| 4,933,584 | 6/1990 | Harms | 310/156 |
| 4,947,066 | 8/1990 | Ghibu et al. | 310/269 |

FOREIGN PATENT DOCUMENTS 153961 11/1981 Japan .................. 310/190

Primary Examiner—Steven L. Stephan
Assistant Examiner—C. LaBalle
Attorney, Agent, or Firm—Nixon & Vanderhye

[57] ABSTRACT

A stator lamination allows the construction of a d.c. motor having minimum cogging torque and maximum horsepower. Each stator lamination comprises a ring of ferromagnetic material having a number of (e.g., eight) inwardly-extending integral teeth. Each tooth has a radially-inwardmost surface with side end terminations, the side end terminations of adjacent teeth being spaced from each other to define a first set of slots. A V-shaped radially-outwardly extending slot is formed in each of the radially-inwardmost surfaces between the side end terminations, to define a second set of slots (if eight teeth are provided, a total of sixteen slots are provided). The teeth have thin stems which may be wrapped with a large amount of copper wire material. The laminations are disposed in a concentric stack with each lamination skewed with respect to an adjacent lamination.

19 Claims, 2 Drawing Sheets

BRUSHLESS DC MOTOR SLOTTED TOOTH LAMINATION

BACKGROUND AND SUMMARY OF THE INVENTION

In the construction of high performance motors, there is a trade-off between a desirably-minimized cogging torque and maximized horsepower (performance). "Cogging" is the non-uniform rotation of a motor rotor caused by the tendency to prefer certain discrete angular positions. It is desirable to have as small a cogging torque as possible, and this is typically obtained by providing a skew angle between the individual laminations in the stack of stator laminations of the d.c. motor. However, with a skew angle, there is a lesser volume available for wrapping with copper fill wire to achieve the desired performance (horsepower).

In a typical prior art construction that demonstrates the competing requirements of low cogging torque and high performance, a four pole rotor, eight slot stator, brushless d.c. motor was constructed. Such a stator needed a 45° skew angle to minimize the magnetic cogging effects. Without such a skew angle, the cogging torque was about 3.0 oz-in. However, with such a construction there was not enough room for copper fill to achieve the desired performance. If instead of an eight slot stator a sixteen slot stator was utilized, the increased iron volume combined with an 22.5° skew angle for cogging, was even more detrimental to performance.

According to the present invention, it is possible to minimize the cogging value, while maximizing performance, reaching a totally acceptable trade-off between these competing characteristics in a brushless d.c. motor. This is accomplished according to the present invention by providing a sixteen slot lamination constructed from laminations that otherwise have a eight slot design, by providing an additional slot in each of the lamination teeth. Thus, while sixteen slots—with a lower cogging level, and one-half the skew angle of the eight slot design—is provided, the winding volume of an eight slot design is maintained. This construction "fools" the magnetic structure of the motor into believing that there are sixteen slots. The motor constructed according to the invention has a cogging torque of only about two-thirds that of the same motor constructed without slotted teeth, with essentially the same performance.

According to one aspect of the present invention, a d.c. motor stator lamination is provided. The lamination comprises a ring of ferromagnetic material having a plurality of radially inwardly-extending integral teeth, the teeth each having a radially-inwardmost surface, with side end terminations, the side end terminations of adjacent teeth radially inwardmost surfaces being spaced from each other to define a first set of slots, and means defining a radially outwardly-extending slot in each of the radially-inwardmost surfaces between the side end terminations thereof, to define a second set of slots. Preferably the plurality of teeth comprises eight teeth, with the first and second slots combined to provide sixteen slots. The slots are preferably V-shaped, having a radiused "bottom" (radially outwardmost) portion, with the second slots each being about 0.06 inches deep and wide.

The invention also comprises a stator for a d.c. motor comprising a plurality of laminations as described above, disposed in a concentric stack. Conductive wire (e.g., copper) wraps around the teeth of the laminations. Each lamination is skewed with respect to an adjacent lamination, the "incremental angle" between adjacent laminations being between about 0–5°, preferably between about 0.1–2°, and most desirably about 0.5° (where eight teeth and sixteen slots are provided).

A brushless d.c. motor having minimized cogging torque and maximized horsepower is constructed utilizing the stator and conductive wire wrappings as described above, along with a rotor on a shaft. Typically, such a motor comprises a four pole rotor, and an eight tooth, sixteen slot, stator.

It is primary object of the present invention to provide stator laminations which allow the construction of a brushless d.c. motor having a minimized cogging torque and a maximized performance. This and other objects of the invention will become clear from an inspection of the detailed description of the invention, and from the appended claims.

DETAILED DESCRIPTION OF THE DRAWINGS

Figure 1:
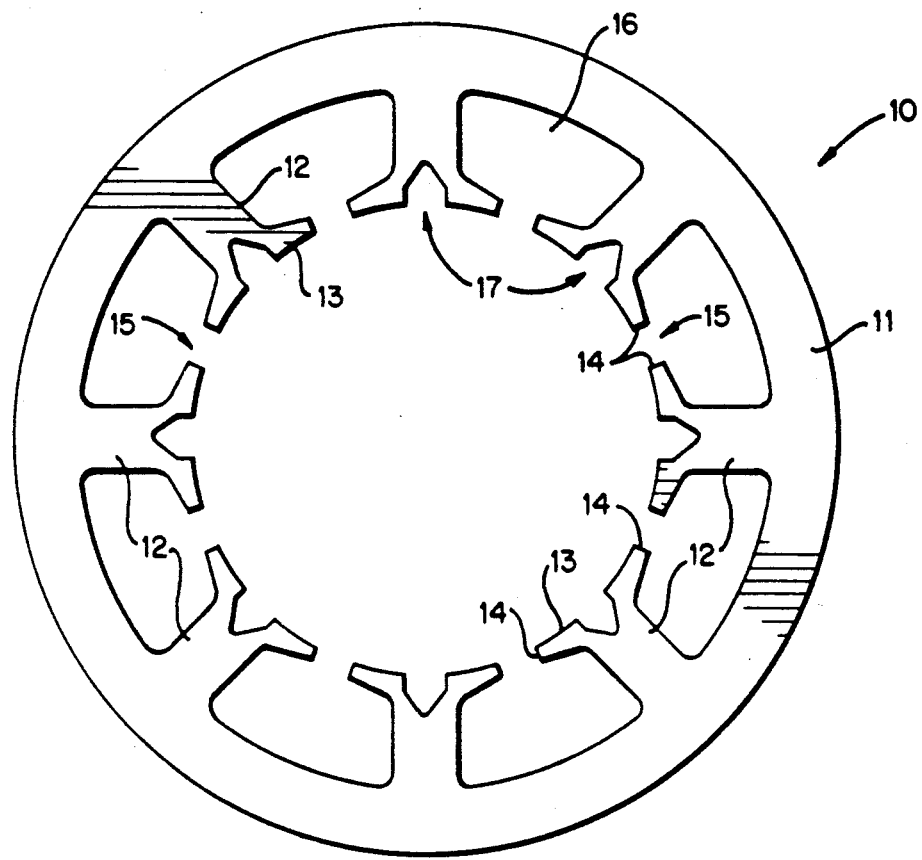
FIG. 1 is a top plan view of an exemplary stator lamination according to the invention.

An exemplary stator lamination according to the present invention is shown generally by reference numeral 10 in FIG. 1. The lamination is constructed of a ferromagnetic material, such as M-19 silicon steel which has been annealed for best magnetic properties. The lamination 10 has a thickness of about 0.014 inches, and is flat within about 0.002 inches. The lamination comprises a ring 11 with a plurality of radially-inwardly extending integral teeth 12. Each tooth 12 has a radially-inwardmost surface 13 with side end terminations 14. The side end terminations of adjacent teeth are spaced from each other to define the first set of slots 15, the slots having a width of about 0.06 inches. Since the "stems" of the teeth 12 (that portion extending from the ring 11 to the surface 13) is relatively thin, there is a great deal of volume in spaces 16 for copper fill, to provide high performance.

According to the present invention, the lamination 10 is provided with means defining a radially-outwardly extending slot 17 in each of the surfaces 15 between the side terminations 14 thereof (and preferably centrally in the tooth 12). The slots 17 define a second set of slots. The slots 15, 17 collectively are twice as numerous as the teeth 12. In the preferred embodiment illustrated in FIG. 1, eight teeth 12, and sixteen slots 15, 17, are provided.

Figure 2:
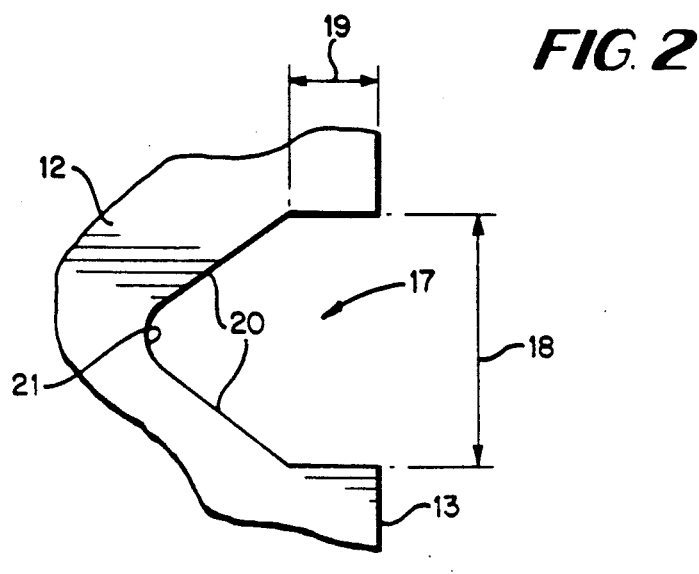
FIG. 2 is an enlarged detailed view of the construction of a slot in one of the teeth of the lamination of FIG. 1.

In order to provide the greatest ease of construction and effectiveness, the slots 17 preferably have a width 18 (see FIG. 2) at the surface 13 which is the same as the width of the slots 15 (e.g., about 0.06 inches). The slots 17 are essentially V-shaped, having a first portion 19 of a dimension of about 0.02 inches which has straight sides extending generally perpendicular to the surface 13 (i.e., radially outwardly), and then transitioning to angled sides 20 which converge towards a radiused "bottom" or radially-outwardmost area 21. The area 21 typically has a radius of about 0.01 inches, and the total depth of the slots 17 (shortest distance from the projection of surface 13 and the radiused bottom 21) is approximately the same as the width of the slots (e.g., about 0.062 inches). The width 18 of slot 17 is approximately one and one-third times the width of the stem of the tooth 12, as illustrated in FIG. 1 (e.g., about 0.082 inches).

Figure 3:
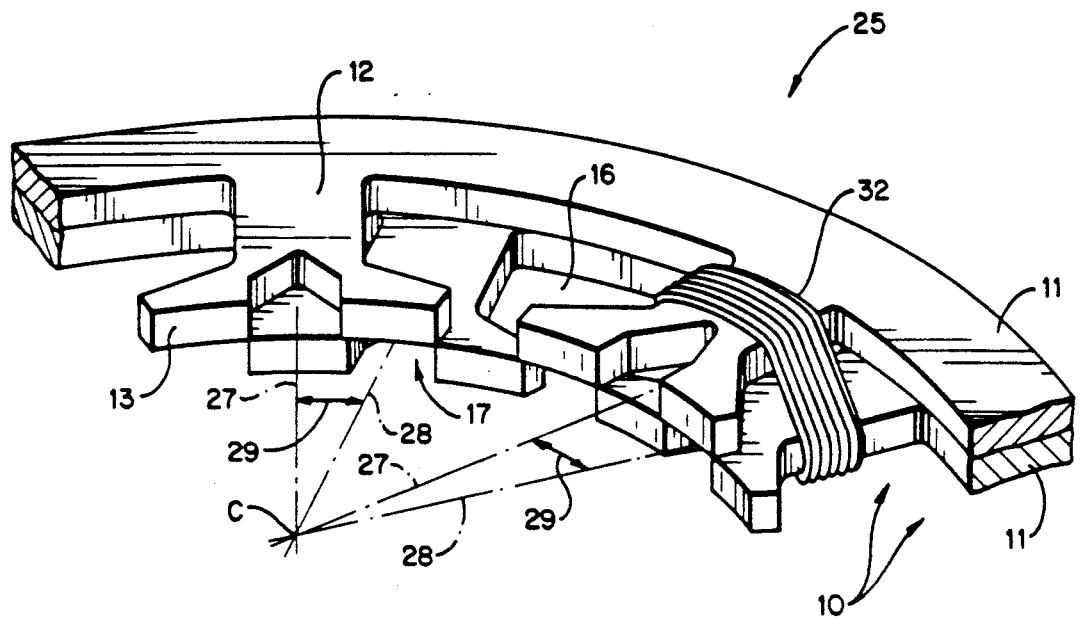
FIG. 3 is a top partial perspective view showing two of the laminations of FIG. 1 in a stack with copper wire wrapping shown schematically.

A stator for a brushless d.c. motor is constructed utilizing a plurality of the laminations 10. FIG. 3 is a schematic view, merely facilitating illustration of how the laminations 10 are constructed into a stack, showing two such laminations. Of course, in an actual motor, there would be many, many laminations in a stack, not merely a small number such as two.

As can be seen in FIG. 3, a stack 25 of laminations is provided wherein the laminations are concentric, having a common center C, with the rings 11 extending around the center C. It is preferred—in order to minimize cogging torque—that teeth 12 between adjacent laminations 10 within a stack are skewed. That is, a line 27 through the center line (e.g., radiused bottom 21 of slot 17) of a tooth 12 of the topmost lamination 10 in FIG. 3 and a similar center line 28 through a tooth 12 in the lowermost lamination illustrated in FIG. 3, have an angular relationship 29. This angle 29, when viewed from the end of stack 25, is known as the "skew angle". According to the invention it is desirable that the skew angle 29 be between about 5–45°, more preferably, 15–30°, and most desirably (for the construction illustrated in FIGS. 1 through 3) about 22.5°. The "incremental angle" between adjacent laminations is about 0–5°, preferably about 0.1–2°, and most preferably about 0.5°, to make up the total skew angle of 15–30°. Despite the fact that the skew angle 29 is provided, there is still plenty of volume for copper fill, which—in the schematic illustrated in FIG. 3—is denoted by the copper wires 32 which wind around the generally aligned teeth 12 in the stack. The windings 32 will fill up substantially the entire volume 16, and will be provided around the stems of all of the teeth 12 of the stack 25.

The width 18 of slot 17 is approximately equal to the width of the stem of the tooth 12, as illustrated in FIG. 1.

Figure 4:
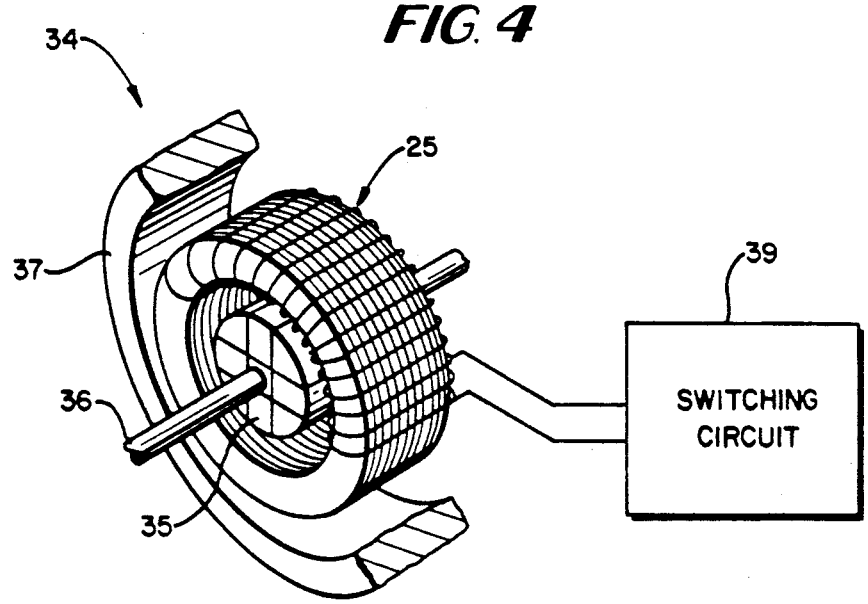
FIG. 4 is a schematic view of a brushless d.c. motor utilizing a stack of stator laminations of FIGS. 1 through 3.

Utilizing a stator 25, such as schematically illustrated in FIG. 3, a brushless d.c. motor 34 (see FIG. 4) may be constructed. The motor has a rotor 35 rotatable about a shaft 36 concentric with the center C of the stator 25. The rotor 35, for the eight tooth, sixteen slot embodiment of the stator illustrated in the drawings, preferably comprises a four pole rotor. The stator 25 and rotor 35 are surrounded by a conventional housing 37, and conventional solid state circuitry 39 is provided to "switch" the stator armature 25.

For a typical motor constructed utilizing laminations 10 of FIG. 1, with a skew angle of 22.5°, has a cogging torque of about 0.50 oz-in. If the motor is constructed from the laminations 10 only without the slots 17, then requiring a skew angle of 45°, the cogging torque is about 0.75 oz-in. Both motors have substantially the same performance (horsepower). Thus, a brushless d.c. motor according to the invention has a minimized cogging torque for a maximized performance.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and devices.

What is claimed is:
1. A d.c. motor stator lamination comprising:
   (a) a ring of ferromagnetic material having a plurality of radially inwardly extending integral teeth;
   (b) said teeth each having a radially inwardmost surface, with side end terminations;
   (c) said side end terminations of adjacent teeth inwardmost surfaces being spaced from each other to define a first set of slots having a first width; and
   (d) means defining a radially outwardly extending slot in each of said radially inwardmost surfaces between said side end terminations thereof, to define a second set of slots, and having initially straight sides extending generally perpendicularly to said radially inwardmost surface, said initially straight sides spaced approximately said first width, and having a V-shape portion after said initially straight sides, said V-shape portion having a radial length greater than the length of an initially straight side.
2. A lamination as recited in claim 1 wherein said plurality of teeth comprise eight teeth, said first and second sets of slots combining to provide a total of sixteen slots.
3. A lamination as recited in claim 2 wherein each of said teeth has a stem extending from said ring to said radially inwardmost surface, said stem having an arcuate length much less than the arcuate length of said radially inwardmost surface.
4. A lamination as recited in claim 1 wherein each of said second slots has a radially-outward narrow portion.
5. A lamination as recited in claim 4 wherein each of said second set of slots has a depth of about 0.06 inches, and wherein said first width is about 0.06 inches.
6. A lamination as recited in claim 1 wherein each of said second set of slots has a depth of about 0.06 inches, and wherein said first width is about 0.06 inches.
7. A stator for a d.c. motor, comprising:
   (i) a plurality of skewed laminations disposed in a concentric stack each lamination comprising:
      (a) a ring of ferromagnetic material having a plurality of radially inwardly extending integral teeth;
      (b) said teeth each having a radially inwardmost surface, with side and terminations;
      (c) said side and terminations of adjacent teeth inwardmost surfaces being spaced from each other to define a first set of slots having a first width; and
      (d) means defining a radially outwardly extending slot in each of said radially inwardmost surfaces between said side end terminations thereof, to define a second set of slots; and having initially straight sides extending generally perpendicularly to said radially inwardmost surface, and then having a V-shape after said initially straight sides, said initially straight sides spaced approximately said first width; and
   (ii) conductive wire wrapping around said teeth of said laminations.

8. A stator as recited in claim 7 wherein each laminations is skewed with respect to an adjacent lamination in said stack so that each lamination has an incremental angle with respect to an adjacent lamination.

9. A stator as recited in claim 8 wherein the incremental angle between adjacent laminations is between about 0.1-2°.

10. A stator as recited in claim 9 wherein the skew angle is about 15-30°.

11. A stator as recited in claim 10 wherein the incremental angle is about 0.5°.

12. A stator as recited in claim 8 wherein said plurality of teeth comprises eight teeth, and wherein said first and second slots combine to comprise sixteen slots.

13. A stator as recited in claim 12 wherein the skew angle is about 22.5°.

14. A stator as recited in claim 7 wherein said radially outwardly extending second set of slots each comprise a V-shaped slot having a wide part defined by said initially straight sides, ad a narrow part, the narrow part being radially outward from the wide part, said narrow part having a radial length greater than the length of an initially straight side.

15. A stator for a d.c. motor as recited in claim 14 wherein each of said second sets of slots has a depth of about 0.06 inches and wherein said first width is about 0.06 inches.

16. A minimized cogging torque, and maximized horsepower, brushless d.c. motor comprising:
    a rotor;
    a shaft;
    a stator, said stator comprising: a plurality of skewed laminations disposed in a concentric stack, each lamination comprising a ring of ferromagnetic material having a plurality of radially inwardly extending integral teeth; said teeth each having a radially inwardmost surface, with said end terminations; said side and terminations of adjacent teeth inwardmost surfaces being spaced from each other to define a first set of slots having a first width; and means defining a radially outwardly extending slot in each of said radially inwardmost surfaces between said side end terminations thereof, to define a second set of slots and having initially straight sides extending generally perpendicularly to said radially inwardmost surface, said initially straight sides spaced approximately said first width, and then having a V-shape portion after said initially straight sides, said V-shape portion having a radial length greater than the length of an initially straight side; and
    conductive wire wrapping around said teeth of said laminations.

17. A motor as recited in claim 16 wherein said plurality of teeth comprises eight teeth, and wherein said first and second slots together combine to provide sixteen slots; and wherein said rotor is a four pole rotor.

18. A motor as recited in claim 17 wherein the skew angle is about 22.5°.

19. A motor as recited in claim 16 wherein each of said second sets of slots has a depth of about 0.06 inches and wherein said first width is about 0.06 inches.

* * * * *